US006733734B2

(12) United States Patent
Watanabe et al.

(10) Patent No.: US 6,733,734 B2
(45) Date of Patent: May 11, 2004

(54) MATERIALS AND METHODS FOR THE PURIFICATION OF HYDRIDE GASES

(75) Inventors: Tadaharu Watanabe, Superior, CO (US); Dan Fraenkel, Ponca City, OK (US)

(73) Assignee: Matheson Tri-Gas, Longmont, CO (US)

( * ) Notice: Subject to any disclaimer, the term of this patent is extended or adjusted under 35 U.S.C. 154(b) by 126 days.

(21) Appl. No.: 10/003,179

(22) Filed: Oct. 31, 2001

(65) Prior Publication Data

US 2003/0097929 A1 May 29, 2003

(51) Int. Cl.[7] .................................................. B01J 8/00
(52) U.S. Cl. ...................... 423/219; 423/210; 423/347; 423/352; 502/304; 502/326; 502/345; 502/349; 502/353; 502/406; 95/117; 95/138; 96/154
(58) Field of Search ...................... 95/117, 138; 96/154; 423/210, 219, 248, 299, 347, 352, 645; 502/304, 305, 326, 345, 349, 353, 406

(56) References Cited

U.S. PATENT DOCUMENTS

| | | | | |
|---|---|---|---|---|
| 4,976,944 A | | 12/1990 | Pacaud et al. | 423/347 |
| 5,637,544 A | * | 6/1997 | Shadman | 502/4 |
| 5,716,588 A | | 2/1998 | Vergani et al. | 422/177 |
| 6,241,955 B1 | | 6/2001 | Alvarez, Jr. | 423/210 |

* cited by examiner

*Primary Examiner*—Stuart L. Hendrickson
*Assistant Examiner*—Maribel Medina
(74) *Attorney, Agent, or Firm*—Steven C. Petersen; Sarah O'Rourke; Hogan & Hartson

(57) ABSTRACT

Regenerable gas purifier materials are provided capable of reducing the level of contaminants such as oxygen and moisture in a hydride gas stream to parts-per-billion levels or sub-parts-per-billion levels. The purifier materials of this invention comprise a thin layer of one or more reduced forms of a metal oxide coated on the surface of a nonreactive substrate. The thin layer may further contain the completely reduced form of the metal. In one embodiment, the total surface area of the thin layer is less than 100 $m^2/g$.

63 Claims, No Drawings

MATERIALS AND METHODS FOR THE PURIFICATION OF HYDRIDE GASES

BACKGROUND OF THE INVENTION

1. Field of the Invention

This invention relates to the field of gas purification, and to the purification of hydride gases that are useful in the microelectronics manufacturing industry. More specifically, the invention relates to methods and materials for selectively removing trace amounts of oxygen impurities and moisture from hydride gases.

2. Description of the Prior Art

The provision of high purity gas streams is critically important in a wide variety of industrial and research applications. The rapid expansion of vapor-phase processing techniques, e.g. chemical vapor deposition, in the semiconductor industry has been associated with the deployment and use of manufacturing equipment that is totally reliant on the delivery of ultra-high purity process gases at the point of use in the semiconductor manufacturing facility.

Considering the impurities which are present in gas streams involved in semiconductor manufacturing, it is to be noted that the growth of high quality thin film electronic and optoelectronic cells by chemical vapor deposition or other vapor-based techniques is inhibited by a variety of low-level process impurities. These impurities can cause defects that reduce yields by increasing the number of rejects, which can be very expensive. These impurities may be particulate or chemical contaminants.

Chemical impurities may originate in the production of the source gas itself, as well as in its subsequent packaging, shipment, storage, and handling. Although source gas manufacturers typically provide analyses of source gas materials delivered to the semiconductor manufacturing facility, the purity of the gases may change because of leakage into or outgassing of the containers, e.g. gas cylinders, in which the gases are packaged. Impurity contamination may also result from improper gas cylinder changes, leaks into downstream processing equipment, or outgassing of such downstream equipment.

Ammonia is a process gas that is very important in the semiconductor industry for the formation of nitride layers in electronic transistors through chemical vapor deposition and epitaxy processes. More specifically, ammonia is commonly used for the formation of silicon nitride and silicon oxynitride films by direct nitridation of silicon oxide. Growing films of silicon nitride and silicon oxynitride requires ammonia of very high purity. Ammonia is also used in the production of compound semiconductors such as GaN, GaAlN, etc. Oxygen is a particularly harmful contaminant because its high chemical reactivity leads to its incorporation as an impurity into films during thermal nitridation of silicon oxide or during the production of GaN and GaAlN semiconductors. The manufacturing of GaN films requires very large amounts of ammonia during the processing steps. New methods of ammonia purification are thus required to reduce the cost of manufacturing wafers in the GaN process. Regenerable purifiers are also becoming more important as the cost of ownership becomes a more critical parameter.

Water vapor and carbon dioxide gas are two other detrimental contaminants in hydride gases, and which can lead to the degradation of products formed by deposition of active layers of metals or metal compounds from a hydride gas environment. Water is one of the most common and yet most difficult impurities to remove from process gases. Most drying processes can reduce the moisture content of a gas to only a "minimum" which is still in the parts per million (ppm) range. However, in the manufacture of components such as high performance light emitting diodes (LEDs), the water content of the depositing gases must be reduced to the parts-per-billion (ppb) range.

Many of the purifier materials such as reduced nickel or copper catalysts that are effective in removing contaminants in more inert gases, such as nitrogen and the noble gases, are not effective in purifying hydride gases. The reactivity of the hydride gases such as ammonia quickly causes degradation of the purifier materials and contaminates the gas stream.

Prior art processes have been described in which oxygen has been removed from ammonia streams by various purifiers. U.S. Pat. No. 5,716,588 to Vergani, et al., describes removing oxygen from ammonia and other hydride gases at room temperature using purifier comprising elemental iron and manganese deposited on an inert material.

U.S. Pat. No. 6,241,955 to Alvarez, Jr. et al, describes high surface metal oxides (greater than 100 $m^2/g$) for removing contaminants such as oxygen, carbon dioxide, and water vapor from hydride gases. The metal oxides are not deposited on a substrate, but rather are used as bulk material within a gas-purifier canister. Since only the active sites on or near the outer surface of the bulk material are accessible to and capable of removing impurities from the gas stream, the Alvarez, Jr., et al., purifier needs to have a larger surface area to be effective.

There remains a need in the art for a reagent that removes contaminants such as oxygen and water from hydride gases. Further, there remains a need for a reagent that is more efficient (removes more contaminants per square meter of surface area) than the prior art. Moreover, there is a need for a purifier material that can be regenerated. Further, a need exists for purifier materials that remove oxygen from hydride gases without concurrently emitting contaminants such as moisture into the purified gas stream and without causing substantial decomposition of the hydride gas.

SUMMARY OF THE INVENTION

Accordingly, this invention provides a purifier material capable of reducing the level of contaminants such as oxygen and moisture in a hydride gas stream to parts-per-billion levels or sub-parts-per-billion levels. The purifier materials of this invention comprise a thin layer of reduced forms of an oxide of a metal deposited or coated onto the surface of a nonreactive substrate. The reduced forms of the metal oxide thin layer coating include one or more reduced oxides of the metal in which the oxidation state of the metal is lower than the maximum oxidation state of the metal. In addition to the reduced oxides of the metal, the thin layer may further include the completely reduced form of the metal (i.e., the metal in a zero oxidation state). In one embodiment, the total surface area of the thin layer coating is less than 100 $m^2/g$.

This invention further provides methods of producing a purifier material of this invention, comprising:

(a) providing a precursor comprising a nonreactive substrate having deposited thereon a thin layer of a metal of a first oxidation state;

(b) heating the precursor under a flow of nitrogen at a temperature between about 100° C. and 600° C. for a period of time; and (c) treating the precursor from step (b) under reductive conditions capable of reducing the oxidation state of the metal, thereby producing a purifier material comprising the substrate having deposited thereon a thin layer of one or more reduced forms of an oxide of the metal having a second oxidation state, wherein the second oxidation state is lower than the first oxidation state.

This invention further provides methods of purifying hydride gases comprising contacting the contaminated hydride gas with a purifier material of this invention.

Additional novel features and advantages of this invention shall be set forth in part in the description that follows, and in part will become apparent to those skilled in the art upon examination of the following specification or may be learned by the practice of the invention. The features and advantages of the invention may be realized and attained by means of the instrumentalities, combinations, and methods particularly pointed out in the appended claims.

DETAILED DESCRIPTION OF THE INVENTION

This invention provides methods of producing purifier materials for removing contaminants such as oxygen and moisture from hydride gases. The purifier materials produced by the methods of this invention are capable of reducing the level of contaminants such as oxygen and moisture in a hydride gas stream to parts-per-billion levels or sub-parts-per-billion levels.

In one embodiment, a purifier material of this invention is produced by the method comprising:

(a) providing a precursor comprising a nonreactive substrate having deposited thereon a thin layer of a metal of a first oxidation state;

(b) heating the precursor under a flow of nitrogen at a temperature between about 100° C. and 600° C. for a period of time; and (c) treating the precursor from step (b) under reductive conditions sufficient to reduce the oxidation state of the metal in the precursor thin layer, thereby producing a purifier material comprising a nonreactive substrate having deposited thereon a thin layer of one or more reduced forms of an oxide of the metal of a second oxidation state, wherein the second oxidation state is lower than the first oxidation state.

In another embodiment, a purifier material of this invention may be produced from a precursor comprising a substrate having deposited thereon a thin layer of a first form of the metal, wherein the purifier material is produced by changing the form of the metal in the thin layer without changing the oxidation state of the metal. For example, in one embodiment the precursor comprises a nonreactive substrate coated with a salt form of the metal. The treatment step comprises treating the precursor with nitrogen, followed by treating the precursor under conditions sufficient to change the form of the metal (e.g., by decomposition of the metal salt) without changing the oxidation state. This embodiment thus produces a purifier comprising a substrate coated with a thin layer of a metal oxide, wherein the oxidation state of the metal oxide of the purifier is the same as the oxidation state of the metal salt of the precursor. Further, the oxidation state of the metal in the purifier thin layer is lower than the maximum oxidation state possible for that metal.

As used herein, the term "precursor" refers to a nonreactive substrate coated with a thin layer of a metal having a first oxidation state or a thin layer of a first (non-oxide) form of a metal. The oxidation state of the metal of the precursor thin layer need not be in its maximum oxidation state.

In one embodiment, the thin layer of either the precursor or the purifier material comprises a monolayer thickness of the particular form of the metal coated or deposited onto the surface of the nonreactive substrate. However, the thin layer may also comprise two or more layers of the particular form of the metal coated onto the surface of the nonreactive substrate. The terms "thin layer," "coating," and "thin layer coating" are used interchangeably herein.

As used herein, the term "nonreactive substrate" refers to a material that is stable under both oxidative and reductive conditions, i.e., a material that is neither oxidized nor reduced under reaction conditions such as those used in the methods of this invention. Examples of nonreactive substrates suitable for purposes of this invention include, but are not limited to, alumina, amorphous silica-alumina, silica ($SiO_2$), aluminosilicate molecular sieves, titania ($TiO_2$) and zirconia ($ZrO_2$). The substrates are commercially available in a variety of shapes of different sizes, including, but not limited to, beads, sheets, extrudates, powders, tablets, etc.

The surface of the precursor substrate can be coated with a thin layer of a particular form of the metal (e.g., a metal oxide or a metal salt) using methods known to those skilled in the art, including, but not limited to, incipient wetness impregnation techniques, ion exchange methods, vapor deposition, spraying of reagent solutions, co-precipitation, physical mixing, etc. In addition, many such coated precursors are commercially available.

As used herein, the terms "metal having a first oxidation state" and "first form of a metal" refer to the form of the metal comprising the thin layer coated onto the surface of the precursor. For example, in one embodiment the precursor coating comprises a thin layer of a metal having a first oxidation state which is consequently treated to produce a purifier material comprising a nonreactive substrate coated with a thin layer of one or more oxides of the metal having a second, lower oxidation state. In another embodiment, the precursor coating comprises a first form of the metal, wherein the first form is other than a metal oxide. In this embodiment, the precursor is treated to produce a purifier material comprising a nonreactive substrate coated with a thin layer of a metal oxide having the same oxidation state as the first form of the metal. Examples of a "metal having a first oxidation state" and "first form of a metal" include, but are not limited to, an oxide, a salt, an acid, an organic complex or an inorganic complex of the metal. Examples of metals suitable for purposes of this invention include, but are not limited to, vanadium, molybdenum, antimony, bismuth, tin, cerium, chromium, cobalt, copper, tungsten, and mixtures thereof. Suitable metal salts for purposes of this invention include, but are not limited to, nitrates, carbonates, oxalates, etc.

To produce the purifier materials of this invention, the coated precursor is preferably first heated under a flow of nitrogen to remove most of the moisture contained in the precursor. It was observed that the removal of water prior to the treatment step (e.g., the reduction step or the decomposition step) allowed the subsequent steps to proceed more efficiently, as discussed below. In one embodiment, the precursor is heated under a flow of nitrogen at a temperature between about 100° C. and 600° C. for a period of time sufficient to remove the majority of the moisture from the precursor. In one embodiment, the precursor is heated under nitrogen for a period of time between about 1 and 200 hours. The precursor is contained in a sealed canister or reactor during the nitrogen treatment, and is maintained in this sealed environment after the nitrogen treatment to prevent recontamination of the precursor with moisture prior to the reduction step.

In one embodiment, the nitrogen-treated precursor is then treated under reductive conditions sufficient to reduce the oxidation state of the metal in the thin layer from a first oxidation state to a second oxidation state, wherein the second oxidation state is lower than the first oxidation state. The product obtained after the reduction step is a purifier material having deposited thereon a thin layer of one or more reduced forms of a metal oxide, wherein the oxidation state of each metal oxide form is lower than the oxidation state of the metal in the precursor coating. However, the reductive conditions used in the methods of this invention do not completely reduce all of the metal in the precursor coating to the elemental metal.

In one embodiment, the reduction step comprises contacting the nitrogen-treated precursor with 100% hydrogen gas at an elevated temperature for a time sufficient to reduce the precursor thin layer metal of a first oxidation state, thereby forming a coating of one or more oxides of the metal having a second, lower oxidation state. In one embodiment, the precursor is heated under a flow of 100% hydrogen at a temperature between about 300° C. and 600° C. for a period of time between about 1 and 200 hours. The resulting purifier material comprises a nonreactive substrate coated with a thin layer comprising one or more reduced forms of an oxide of the metal. In one embodiment, a percentage of the thin layer of the purifier material further contains the metal in its zero oxidation state.

In another embodiment, the reduction step comprises contacting the nitrogen-treated precursor with a gaseous mixture comprising hydrogen and an inert or nonreactive gas such as argon, helium, or nitrogen, where the mixture comprises from about 0.1% up to 100% hydrogen. Reaction variables such as time, temperature, etc., are selected such that the reductive conditions are sufficient to reduce the precursor thin layer metal of a first oxidation state, thereby forming a coating of one or more oxides of the metal having a second, lower oxidation state.

In another embodiment, the reductive conditions comprise contacting the nitrogen-treated precursor with a gaseous mixture comprising hydrogen and a reactive gas such as ammonia, where the mixture comprises from about 0.1% up to 100% hydrogen. Reaction variables such as time, temperature, etc. are selected such that the reductive conditions are sufficient to reduce the precursor thin layer metal of a first oxidation state, thereby forming a coating of one or more oxides of the metal having a second, lower oxidation state.

In another embodiment, the reduction step comprises contacting the nitrogen-treated precursor with either 100% ammonia, or with a gaseous mixture comprising ammonia and an inert or nonreactive gas such as argon, helium, or nitrogen, where the mixture comprises from about 0.1% up to 100% ammonia. Reaction variables such as time, temperature, etc. are selected such that the reductive conditions are sufficient to reduce the precursor thin layer metal of a first oxidation state, thereby forming a coating of one or more oxides of the metal having a second, lower oxidation state.

In another embodiment, the oxidation state of the metal in the precursor thin layer is reduced by reacting the nitrogen-treated precursor with a reducing agent such as hydrazine, hydrazine derivative, lithium aluminum hydride, etc., either in a liquid solution or in the gas phase, according to methods known in the art. Reaction variables such as time, temperature, etc., are selected such that the reductive conditions are sufficient to reduce the precursor thin layer metal of a first oxidation state, thereby forming a coating of one or more oxides of the metal having a second, lower oxidation state.

In one embodiment, a purifier material may be produced from a precursor comprising a nonreactive substrate coated with a thin layer of a first form of the metal, such as a metal salt, wherein the treatment step comprises decomposing the metal salt to produce a thin layer of a metal oxide without changing the oxidation state of the metal. In this embodiment, the oxidation state of the metal in the precursor coating is lower than the maximum oxidation state possible for that metal. In one example, the precursor comprises a thin layer of cerium (III) nitrate coated onto the surface of an alumina substrate. In this embodiment, the precursor is treated with nitrogen, followed by subjecting the precursor to conditions that will decompose the cerium (III) nitrate to cerium (III) oxide.

In general, the final purifier material comprises about 1 to 20% of the reduced forms of the metal oxide and about 80 to 99% of the substrate. In one embodiment, the total surface area of the thin layer of the final purifier material is less than 100 m$^2$/g. In another embodiment, the total surface area of the thin layer of the final purifier material is between about 10 and 95 m$^2$/g.

As used herein, the terms "reduced forms of an oxide of the metal" and "metal oxide having a second, lower oxidation state" refer to one or more oxide forms of the metal in which the metal has a lower oxidation state than that of the metal in the precursor thin layer. The thin layer of a final purifier product of this invention may contain one or more different metal oxides. Thus, the term "second oxidation state" is not limited to one specific oxidation state, but rather encompasses different oxide forms of the metal, wherein each of the metal oxides in the purifier coating has an oxidation state that is lower that that of the metal of the precursor coating.

For example, in one embodiment the metal oxide thin layer of a precursor is a molybdenum oxide. Molybdenum is known to form at least four oxides, which are, in descending order of oxidation state of molybdenum, $MoO_3$, $Mo_2O_5$, $MoO_2$, and $Mo_2O_3$. Thus, if the precursor comprises a thin layer of $MoO_3$ (in which the oxidation state of Mo is +6), then the reduction step can produce a final purifier material having a thin layer that contains one or more of the lower oxides of molybdenum, including $Mo_2O_5$, $MoO_2$, and $Mo_2O_3$. In addition to the one or more reduced forms of molybdenum oxide, a percentage of the thin layer of the purifier material may also contain metallic molybdenum (Mo), i.e., molybdenum in its zero oxidation state. The composition of the thin layer of the purifier material will of course depend on the amount of time the precursor is exposed to hydrogen gas during the reduction step, as well as the temperature during the reduction. Alternatively, if the precursor comprises a thin layer of $Mo_2O_5$ (in which the oxidation state of Mo is+5), then the thin layer of the final purifier material may comprise one or more of the lower oxides of molybdenum, including $MoO_2$ and $Mo_2O_3$, and may further contain molybdenum in its zero oxidation state (Mo).

It is not necessary that the first oxidation state of the metal in the precursor thin layer be the maximum oxidation state for that metal. However, at least a portion of the metal in the final purifier thin layer is a reduced metal oxide. That is, the second oxidation state of the metal in the final product thin layer is between the first oxidation state of the metal of the precursor layer and the zero oxidation state of the metal. While not wishing to be bound by any theory, it is believed that the partially reduced metal oxide forms of the metal produce a more stable coating on the nonreactive substrate, as opposed to a fully reduced metal coating, in which the elemental metal could sinter before or during a gas purification process, thereby losing most of its efficiency.

The present invention also includes methods of purifying contaminated hydride gases using the purifier materials of this invention. More specifically, this invention provides a method of removing contaminants such as oxygen and moisture from a hydride gas stream comprising contacting the contaminated gas stream with a purifier material for a period of time sufficient to reduce the level of the contaminants to parts-per-billion levels. The purifier material of this invention is generally contained within a gas-purifier chamber having a gas inlet and outlet. Many container configurations are well known to those skilled in the art. In one embodiment the container is made of a material that is resistant to hydride gases, such as stainless steel. Alternatively the container can be coated on the inside surface with a hydride-resistant material. The purifier materials of this invention can be made in situ (i.e., within the container to be used in a gas purification system). Alternatively, the purifier materials can be made in a separate container and subsequently transferred to a gas-purifier container.

The purifier materials can be used in any compatible gas purifier system in the art, including systems used to purify hydride gases for use in semiconductor processes. The method of purifying hydride gases generally comprises flowing the contaminated hydride gas through a container in which a purifier material of this invention is retained. Typically, hydride gas flow rates during a purification process are in the range of about 1 to 200 standard liters per minute (splm). Operating temperatures of the hydride gases can range from about 0° C. to 70° C.

As used herein, the term "hydride gas" includes, but is not limited to, ammonia ($NH_3$), arsine ($AsH_3$), phosphine ($PH_3$), germane ($GeH_4$), silane ($SiH_4$), methyl silane, t-butyl arsine, t-butylphosphine, and alkyl or halide derivatives thereof, and any gaseous compound containing an active hydride moiety, or mixtures thereof.

One of the advantages of a purifier material of this invention is that it comprises a thin layer coating of one or more reduced forms of the metal oxide on the surface of the substrate. As a result, all or substantially all of the active sites of the thin layer are exposed to the contaminated hydride gas during the purification step, thus increasing the efficiency of the thin layer to trap and thus remove contaminants from the hydride gas stream. This is a significant improvement over bulk metal oxide purifiers in the art which are not coated onto substrates, since many of the active sites in the bulk purifiers are not situated at or near the surface of the bulk material and therefore are not accessible to the contaminants.

A further advantage of the purifier materials of this invention is that they can be regenerated more efficiently, as discussed below in Examples 2 and 3, thus extending the lifetime of the purifier material. In addition, the purifier materials of this invention are potentially more stable than other purifier materials in the art.

The purifier materials of this invention are suitable for purifying gases for semiconductor and other electronic substrate manufacturing, including the hydride gases as described above, as well as other reactive gases including, but not limited to, trimethyl aluminum, trimethyl gallium, and trimethyl indium. More generally, the purifier materials of this invention are useful for removing contaminants from any gas that is used for deposition of component materials for any other type of high purity product where moisture and/or oxygen content is detrimental to the product's production. This could include, for instance, production of high purity substrates or other types of materials for research purposes, production of optical fibers and optoelectronic devices (including lasers) and production of high purity materials that are to be used in extreme environments such as products for use in spacecraft or artificial satellites.

The performances of several purifier materials provided by this invention are illustrated in Examples 2, 3, 4 and 5 below.

EXAMPLE 1

Deposition of Cerium Nitrate onto Alumina by Incipient Wetness Impregnation

Alumina was modified by $Ce(NO_3)_3 \cdot 6H_2O$ to form a cerium oxide coating (150–200 $m^2/g$) on the alumina using an incipient wetness impregnation technique. About 222 mL (122.77 g) of Condea alumina beads (Puralox Scca 90–120; Condea Vista Company), was dried was dried in a vacuum oven at about 110° C. overnight, then cooled to room temperature under vacuum. To this was added a solution of 19.0 g $Ce(NO_3)_3 \cdot 6H_2O$ in 36.8 g $H_2O$ dropwise in a 600 mL beaker. After about 30–40 minutes, all of the solution was added without any observation of outside wetting of the alumina beads. The material obtained was capped by aluminum foil and allowed to equilibrate at room temperature for about 20 hours. The material was then heated to about 110° C. for about 20 hours in a vacuum oven. A sample of the obtained (dry) $Ce(O_3)_3 \cdot 6H_2O/Al_2O_3$ (containing about 5% Ce) was analyzed by thermogravimetric analysis using a TGA-7 thermogravimetric analyzer from PerkinElmer. Two peaks were obtained, one at about 200° C. and the other at about 400° C. The peak at about 200° C. is moisture (as in $Al_2O_3$) and the peak at about 400° C. (not found in $Al_2O_3$) was due to nitrate decomposition. Decomposition starts at about 280° C. (at 20° C./min heating rate) and is complete at about 550° C.

EXAMPLE 2

Assaying the Oxygen and Moisture Adsorbing Capabilities of High Surface Area $Mo_xO_y/Al_2O_3$ Purifier Materials A high surface area (210 $m^2/g$) precursor comprising a thin layer of molybdenum oxide $Mo_xO_y/Al_2O_3$ (i.e., where x=0–2 and y=0–3) on the surface of an alumina substrate was purchased from Prototech Company (Needham, Mass.). The precursor was then treated under various conditions with nitrogen, followed by hydrogen to produce purifier materials according to this invention. The treatment conditions are summarized in Table 1. The purifier materials (60 cc) were then tested for their efficiency at removing oxygen from ammonia. The results are summarized in Table 1.

TABLE 1

High surface area $Mo_xO_y/Al_2O_3$ purifiers

| Sample | Treatment conditions | Efficiency (ppb $O_2$) | Capacity $O_2$/material (L/L) |
|---|---|---|---|
| 1-1 | $N_2$ at 330° C. for 16 h; 10% $H_2$, 330° C. for 6 h | <100 | 0.4 |
| 1-2 | $N_2$ at 400° C. for 16 h; 10% $H_2$ at 400° C. for 24 h | <100 | 1.0 |
| 1-3 | 100% $H_2$ at 300° C. for 5 h | <100 | 1.0 |
| 2-1 | $N_2$ at 330° C. for 16 h; 10% $H_2$ at 300° C. for 16 h | <100 | 0.2 |
| 2-2 | 100% $H_2$ at 300° C. for 5 h | <100 | 0.7 |

TABLE 1-continued

High surface area $Mo_xO_y/Al_2O_3$ purifiers

| Sample | Treatment conditions | Efficiency (ppb $O_2$) | Capacity $O_2$/material (L/L) |
|---|---|---|---|
| 3-1 | $N_2$ at 300° C. for 18 h; 100% $H_2$ at 300° C. for 5 h | <100 | 0.5 |
| 3-2 | 100% $H_2$ at 300° C. for 10 h | <100 | 0.9 |
| 3-3 | 100% $H_2$ at 400° C. for 20 h | <100 | 1.3 |

In Table 1, the formula "$Mo_xO_y/Al_2O_3$" indicates the various reduced forms of the metal oxide on the alumina substrate (i.e., where x=0–2 and y=0–3). To prepare sample 1-1 in Table 1, fresh $Mo_xO_y/Al_2O_3$ from Prototech Company was conditioned under a stream of nitrogen for 16 hours at 330° C. and subsequently reduced under a stream of 10% hydrogen for 6 hours at 330° C. The ability of the purifier material 1-1 to adsorb oxygen was measured by flowing ammonia containing 250 parts per million (ppm) of oxygen at a rate of 2 slpm through a reactor retaining the purifier material, and analyzing the oxygen concentration of the effluent gas on a gas chromatogram with a deionized detector. The calculated adsorption capacity of sample 1-1 was determined by standard methods to be about 0.4 liters of oxygen for each liter of purifier material and was found for sample 1-1. The efficiency of the material in removing oxygen was measured using a gas chromatogram with a deionized detector (GC-DID) and was below the detection limit of the instrument. Sample 1-1 was then reconditioned to produce the $Mo_xO/Al_2O_3$ purifier material 1-2 using the conditions shown in Table 1. Sample 1-2 was then tested for its ability to adsorb oxygen contained in ammonia as above. An adsorption capacity of about 1.0 liters of oxygen for each liter of sample 1-1 was found.

Sample 1-2 was then reconditioned to produce the $Mo_xO_y/Al_2O_3$ purifier material 1-3 using the conditions shown in Table 1. An adsorption capacity of about 1.0 liters of oxygen for each liter of sample 1-3 was found.

In a similar manner, $Mo_xO_y/Al_2O_3$ purifier material 2-1 was prepared starting with fresh precursor, which was conditioned and tested as above. $Mo_xO_y/Al_2O_3$ purifier material 2-2 was prepared by reconditioning $Mo_xO_y/Al_2O_3$ purifier material 2-1, and then its adsorption capacity was tested as summarized in Table 1.

In a similar manner, $Mo_xO_y/Al_2O_3$ purifier material 3-1 was prepared starting with fresh precursor, which was conditioned and tested as above. $Mo_xO_y/Al_2O_3$ purifier material 3-2 was prepared by reconditioning $Mo_xO_y/Al_2O_3$ purifier material 3-1, and then its adsorption capacity was tested as summarized in Table 1.

A purifier material prepared by conditioning $Mo_xO_y/Al_2O_3$ in nitrogen at 300° C. for 18 hours and then in 100% hydrogen at 300° C. for 10 hours showed 500 ppb of moisture emission when ammonia was introduced to this material. However, a purifier material prepared by conditioning $Mo_xO_y/Al_2O_3$ in nitrogen at 400° C. for 18 hours and then in 100% hydrogen at 400° C. for 48 hours was efficient in removing moisture from ammonia (i.e., the efficiency was less than 100 ppb). These results demonstrate the importance of the conditioning methods in preparing purifier materials of this invention, and how the conditioning methods used according to the methods of this invention influence the performance of the purifier material.

The results described in Example 1 also show that the purifier materials of this invention efficiently remove oxygen from hydride gases and demonstrate that the purifier materials of this invention are regenerable.

EXAMPLE 3

Assaying the Oxygen and Moisture Adsorbing Capabilities of High Surface Area $Ce_xO_y/Al_2O_3$ Purifier Materials Various purifier materials comprising a thin layer of reduced forms of cerium oxide coated on an alumina substrate were prepared and tested for their efficiency in removing oxygen from ammonia and helium. The results are summarized in Table 2, where the formula "$Ce_xO_y/Al_2O_3$" indicates the various reduced forms of the metal oxide on the alumina substrate (i.e., where x=0–3 and y=0–2). Sample 6 started with fresh $Ce(NO_3)_3 \cdot 6H_2O/Al_2O_3$ (containing about 5% Ce) prepared as described in Example 1. This material was conditioned twice with nitrogen at different temperatures as shown in Table 2. This sample was tested for its ability to remove oxygen from ammonia as described above. The results obtained for sample 6 indicate that treating a precursor material with nitrogen alone (i.e., without subsequently treating the precursor to reducing conditions) is not sufficient to produce a material that is efficient in removing trace levels of oxygen from a hydride gas.

To prepare sample 7-1, fresh $Ce(NO_3)_3 \cdot 6H_2O/Al_2O_3$ (containing about 5% Ce) was prepared as described in Example 1. This material was conditioned twice with nitrogen at different temperatures and then conditioned with 10% hydrogen to produce a $Ce_xO_y/Al_2O_3$ purifier material 7-1 as summarized in Table 2. Sample 7-1 was tested for its ability to remove oxygen from ammonia as described above. Sample 6 was not efficient in removing oxygen.

The conditioned and tested purifier material 7-1 was reconditioned using only 100% hydrogen to produce a $Ce_xO_y/Al_2O_3$ purifier material 7-2 as summarized in Table 2. Purifier material 7-2 was first tested for its efficiency in adsorbing oxygen contained in helium, and then tested for its efficiency in removing beth oxygen from ammonia. As shown in Table 2, purifier material 7-2 was found to be efficient in removing oxygen from helium but not from ammonia.

The conditioned and tested purifier material 7-2 was reconditioned first with nitrogen and then with 10% hydrogen to produce a $Ce_xO_y/Al_2O_3$ purifier material 7-3 as summarized in Table 2. Purifier material 7-3 was first tested for its efficiency in adsorbing oxygen contained in helium. Purifier material 7-3 was found to be efficient in removing oxygen from helium. An adsorption capacity of about 0.4 liters of oxygen for each liter of sample 7-3 was found.

TABLE 2

Ce$_x$O$_y$/Al$_2$O$_3$ purifiers

| Sample | Treatment conditions | NH$_3$ Efficiency (ppb O$_2$) | NH$_3$ Capacity O$_2$/material (L/L) | He Efficiency (ppb O$_2$) | He Capacity O$_2$/material (L/L) |
|---|---|---|---|---|---|
| 6 | N$_2$ at 200° C. for 3 h; N$_2$ at 550° C. for 3 h | No efficiency | — | — | |
| 7-1 | N$_2$ at 200° C. for 3 h; N$_2$ at 550° C. for 3 h; 10% H$_2$ at 550° C. for 3 h | 19,000 | — | — | — |
| 7-2 | 100% H$_2$ at 300° C. for 5 h | No efficiency | — | <100 | — |
| 7-3 | N$_2$ at 100° C. for 3 h; 10% H$_2$ at 550° C. for 3 h | | — | <100 | 0.4 |

EXAMPLE 4

Assaying the Oxygen and Moisture Adsorbing Capabilities of Low Surface Area Mo$_x$O$_y$/Al$_2$O$_3$ Purifier Materials A low surface area (86 m$^2$/g) precursor comprising molybdenum (III) oxide on an alumina substrate was purchased from Prototech Company. The precursor was first conditioned under a flow of nitrogen at 400° C. for 18 hours, followed by reduction with 100% hydrogen at 400° C. for 48 hours to produce low surface area Mo$_x$O$_y$/Al$_2$O$_3$ purifier materials according to this invention. The ability of the purifier material 1-1 to adsorb oxygen was measured by flowing ammonia containing 200 ppm of oxygen, at a rate of 2 slpm, through a 60 cc canister containing the purifier material. The oxygen concentration of the effluent gas was analyzed on a gas chromatogram with a deionized detector. The results are summarized in Table 3, which shows that the low surface area Mo/Al$_2$O$_3$ purifier materials consistently remove oxygen from ammonia very efficiently. Further, it was found that compared with the high surface area materials which have problems with surface area degradation during conditioning procedures at high temperatures, the low surface material does not suffer surface degradation, even after being regenerated one or more times.

TABLE 3

Low surface area Mo/Al$_2$O$_3$ purifier material

| Sample | Efficiency (ppb O$_2$) | Capacity O$_2$/material (L/L) |
|---|---|---|
| 1 | <100 | 0.92 |
| 2 | <100 | 0.56 |
| 3 | <100 | 0.72 |
| 4 | <100 | 1.2 |
| 5 | <100 | 0.8 |

EXAMPLE 5

Assaying the Oxygen and Moisture Adsorbing Capabilities of Various Purifier Materials Table 4 summarizes purifier materials prepared according to this invention and tested for their ability to adsorb oxygen and moisture from ammonia and helium. Table 4 demonstrates that the ability to remove oxygen from a matrix gas is dependent on the type of metal in the thin layer coating of the purifier material. In addition, it was found that Ni$_x$O$_y$/Al$_2$O$_3$ was capable of removing oxygen from an inert gas (e.g., helium) but not from ammonia. Ce$_x$O$_y$/Al$_2$O$_3$ is capable of removing oxygen from ammonia, but not as efficiently as purifier materials in which the metal in the thin layer coating is molybdenum, copper, or cobalt.

Although many materials are able to remove oxygen in an inert gas, the inventors discovered that only certain purifiers such as those described by the present invention are effective in removing oxygen from hydride gases such as ammonia.

TABLE 4

| | NH$_3$ GAS DATA | | | He GAS DATA | | |
|---|---|---|---|---|---|---|
| Purifier Media | Efficiency (ppb) | capacity (L/L) | Analytical method | efficiency (ppb) | capacity (l/l) | Analytical method |
| Mo$_x$O$_y$/Al$_2$O$_3$ (86 m$^2$/g or 220 m$^2$/g) | O$_2$/NH$_3$: <100 H$_2$O/NH$_3$: <50 | O$_2$/NH$_3$: 0.9–1.3 H$_2$O/NH$_3$: 2.2 | GCDID FTIR | — | — | — |
| Ce$_x$O$_y$/Al$_2$O$_3$ (200 m$^2$/g) | O$_2$/NH$_3$: 19 ppm | — | GCDID | O$_2$:<100 | — | GCDID |
| Co$_x$O$_y$/Al$_2$O$_3$ (235 m$^2$/g) | O$_2$/NH$_3$: <100 | O$_2$/NH$_3$: >0.4 | GCDID | O$_2$:<100 | — | GCDID |

TABLE 4-continued

| Purifier Media | NH₃ GAS DATA | | | He GAS DATA | | |
|---|---|---|---|---|---|---|
| | Efficiency (ppb) | capacity (L/L) | Analytical method | efficiency (ppb) | capacity (l/l) | Analytical method |
| $Ni_xO_3/Al_2O_3$ (3–4% Ni) (100–200 m²/g) | $O_2/NH_3$: not effective | — | GCDID | $O_2$:<100 | — | GCDID |
| $Cu_xO_y/Al_2O_3$ (187 m²/g) | $O_2/NH_3$: <100 | — | GCDID | $O_2$:<100 | — | GCDID |

The foregoing description is considered as illustrative only of the principles of the invention. Further, since numerous modifications and changes will be readily apparent to those skilled in the art, it is not desired to limit the invention to the exact construction and process shown as described above. Accordingly, all suitable modifications and equivalents may be resorted to falling within the scope of the invention as defined by the claims that follow.

The words "comprise," "comprising," "include," "including," and "includes" when used in this specification and in the following claims are intended to specify the presence of stated features, integers, components, or steps, but they do not preclude the presence or addition of one or more other features, integers, components, steps, or groups thereof.

We claim:

1. A method of removing oxygen and water from a hydride or a reactive gas stream comprising contacting said contaminated gas stream with a purifier material for a period of time sufficient to reduce the level of said contaminants to parts-per-billion levels, said purifier material consisting essentially of a nonreactive substrate having a surface and a thin layer of one or more reduced forms of an oxide of one or more metals deposited on said substrate surface.

2. The method of claim 1, wherein the oxidation state of said metal of said purifier thin layer is lower than the maximum oxidation state of said metal.

3. The method of claim 2, wherein said reduced form of said metal oxide includes said metal in a zero oxidation state.

4. The method of claim 1, wherein said metal oxide is selected from the group consisting of oxides of vanadium, molybdenum, antimony, bismuth, tin, cerium, chromium, cobalt, copper, tungsten, and mixtures thereof.

5. The method of claim 1, wherein said substrate is selected from the group consisting of alumina, amorphous silica-alumina, silica ($SiO_2$), aluminosilicate molecular sieves, titania ($TiO_2$) and zirconia ($ZrO_2$).

6. The method of claim 1, wherein said hydride gas is selected from the group consisting of ammonia ($NH_3$), arsine ($AsH_3$), phosphine ($PH_3$), germane ($GeH_4$), silane ($SiH_4$), methyl silane, t-butyl arsine, t-butyl phosphine, and alkyl and halide derivatives thereof.

7. The method of claim 1, wherein said reactive gas is selected from the group consisting of trimethyl aluminum, trimethyl gallium, and trimethyl indium.

8. The method of claim 1, wherein said purifier material is prepared by the method comprising:
    (a) providing a precursor comprising a nonreactive substrate having a surface and a thin layer of one or more metals of a first oxidation state deposited on said substrate surface;
    (b) heating said precursor under a flow of nitrogen at a temperature between about 100° C. and 600° C. for a period of time; and
    (c) treating said precursor from step (b) under reductive conditions sufficient to reduce the oxidation state of said metal of said precursor thin layer, thereby producing said purifier material, wherein the metal of the purifier thin layer has a second oxidation state that is lower than said first oxidation state.

9. The method of claim 8, wherein said metal of a first oxidation state is selected from the group consisting of an oxide, a salt, an acid, an organic complex, and an inorganic complex of said metal.

10. The method of claim 8, wherein said precursor thin layer is deposited on said substrate surface by a method selected from the group consisting of incipient wetness impregnation, ion exchange methods, vapor deposition, spraying of reagent solutions, co-precipitation, and physical mixing.

11. The method of claim 8, wherein step (c) comprises heating said precursor from step (b) under a flow of a gaseous mixture comprising 100% ammonia at a sufficient temperature for a time sufficient to produce said purifier material.

12. The method of claim 8, wherein step (c) comprises heating said precursor from step (b) under a flow of a gaseous mixture comprising from about 0.1% up to 100% hydrogen, the remainder of said mixture comprising a gas selected from the group consisting of an inert gas, a nonreactive gas and a reactive gas.

13. The method of claim 8 wherein step (c) comprises heating said precursor under a flow of 100% hydrogen at a temperature between about 300° C. and 600° C. for between about 1 and 200 hours.

14. The method of claim 1, wherein the total surface area of said thin layer of said purifier material is less than 100 m²/g.

15. The method of claim 14, wherein total surface area of said thin layer of said purifier material is between about 10 and 95 m²/g.

16. The method of claim 1, wherein said purifier material comprises between about 1 to 20% of said reduced forms of said metal oxide and about 80–99% of said substrate.

17. A method of removing contaminants from a hydride gas stream comprising contacting said contaminated gas stream with a purifier material for a period of time sufficient to reduce the level of said contaminants to parts-per-billion levels, said purifier material comprising a nonreactive substrate having a surface and a thin layer of one or more reduced forms of an oxide of one or more metals deposited on said surface, said thin layer having a total surface area less than 100 m²/g.

18. The method of claim 17, wherein total surface area of said thin layer of said purifier material is between about 10 and 95 m²/g.

19. The method of claim 17, wherein the oxidation state of said metal of said purifier thin layer is lower than the maximum oxidation state of said metal.

20. The method of claim 19, wherein said reduced form of said metal oxide includes said metal in a zero oxidation state.

21. A method of removing contaminants from a hydride gas stream comprising contacting said contaminated gas stream with a purifier material for a period of time sufficient to reduce the level of said contaminants to parts-per-billion levels, said purifier material consisting essentially of a nonreactive substrate having a surface and a thin layer of one or more reduced forms of an oxide of one or more metals deposited on said substrate surface, said metals selected from the group consisting of vanadium, molybdenum, antimony, bismuth, tin, cerium, chromium, cobalt, tungsten, and mixtures thereof, wherein the oxidation state of said metal in said purifier thin layer is lower than the maximum oxidation state of said metal.

22. The method of claim 21, wherein said reduced form of said metal oxide includes said metal in a zero oxidation state.

23. The method of claim 21, wherein the total surface area of said thin layer of said purifier material is less than 100 $m^2/g$.

24. The method of claim 23, wherein total surface area of said thin layer of said purifier material is between about 10 and 95 $m^2/g$.

25. A method of preparing a purifier material for removing contaminants from a hydride gas stream, said method comprising:
(a) providing a coated precursor consisting essentially of a nonreactive substrate having a surface and a thin layer of one or more metals of a first oxidation state deposited on the substrate surface;
(b) heating said precursor under a flow of nitrogen at a temperature between about 100° C. and 600° C. for a period of time; and
(c) treating said precursor from step (b) under reductive conditions sufficient to produce said purifier material consisting essentially of said nonreactive substrate having a surface and a thin layer of one or more reduced forms of an oxide of said one or more metals of a second oxidation state deposited on said surface, wherein said second oxidation state is lower than said first oxidation state.

26. The method of claim 25, wherein step (c) comprises heating said precursor from step (b) under a flow of 100% hydrogen at a temperature between about 300° C. and 600° C. for between about 1 and 200 hours.

27. The method of claim 25, wherein step (c) comprises heating said precursor from step (b) under a flow of a gaseous mixture comprising from about 0.1% up to 100% hydrogen, the remainder of said mixture comprising a gas selected from the group consisting of an inert gas, a nonreactive gas, and a reactive gas.

28. The method of claim 25, wherein step (c) comprises heating said precursor from step (b) under a flow of a gaseous mixture comprising 100% ammonia at a sufficient temperature for a time sufficient to produce said purifier material.

29. The method of claim 25, wherein step (c) comprises heating said precursor from step (b) under a flow of a gaseous mixture comprising from about 0.1% up to 100% ammonia, the remainder of said mixture comprising a gas selected from the group consisting of an inert gas, a nonreactive gas, and hydrogen.

30. The method of claim 25, wherein step (c) comprises contacting said precursor from step (b) with a reducing agent.

31. The method of claim 30, wherein said reducing agent is selected from the group consisting of hydrazine, a hydrazine derivative, and lithium aluminum hydride.

32. The method of claim 25, wherein the oxidation state of said metal in said purifier thin layer is lower than the maximum oxidation state of said metal.

33. The method of claim 32, wherein said reduced form of said metal oxide includes said metal in a zero oxidation state.

34. The method of claim 25, wherein said one or more metals are selected from the group consisting of vanadium, molybdenum, antimony, bismuth, tin, cerium, chromium, cobalt, copper, tungsten, and mixtures thereof.

35. The method of claim 25, wherein said substrate is selected from the group consisting of alumina, amorphous silica-alumina, silica ($SiO_2$), aluminosilicate molecular sieves, titania ($TiO_2$) and zirconia ($ZrO_2$).

36. The method of claim 25, wherein said hydride gas is selected from the group consisting of ammonia ($NH_3$), arsine ($AsH_3$), phosphine ($PH_3$), germane ($GeH_4$), silane ($SiH_4$), methyl silane, t-butyl arsine, t-butyl phosphine, and alkyl and halide derivatives thereof.

37. The method of claim 25, wherein said contaminants are selected from the group consisting of oxygen and moisture.

38. The method of claim 25, wherein the total surface area of said thin layer of said purifier material is less than 100 $m^2/g$.

39. The method of claim 38, wherein total surface area of said thin layer of said purifier material is between about 10 and 95 $m^2/g$.

40. The method of claim 25, wherein said purifier material comprises between about 1 to 20% of said reduced forms of said metal oxide and about 80–99% of said substrate.

41. A purifier material prepared by the method of claim 25 and comprising a nonreactive substrate having a surface and a thin layer of one or more reduced forms of an oxide of one or more metals deposited on said surface, wherein the total surface area of said thin layer of said purifier material is less than 100 $m^2/g$.

42. The purifier material of claim 41, wherein total surface area of said thin layer of said purifier material is between about 10 and 95 $m^2/g$.

43. The purifier material of claim 41, wherein the oxidation state of said metal of said purifier thin layer is lower than the maximum oxidation state of said metal.

44. The purifier material of claim 41, wherein said thin layer further contains said metal in a zero oxidation state.

45. The purifier material of claim 41, wherein said purifier material is regenerable.

46. A purifier material for removing contaminants from a hydride gas stream, said purifier material comprising a nonreactive substrate having a surface and a thin layer of one or more reduced forms of an oxide of one or more metals deposited on said substrate surface, wherein said metal is selected from the group consisting of vanadium, molybdenum, antimony, bismuth, tin, cerium, chromium, cobalt, tungsten, and mixtures thereof.

47. The purifier material of claim 46, wherein the total surface area of said thin layer of said purifier is less than 100 $m^2/g$.

48. The purifier material of claim 47, wherein the total surface area of said thin layer of said purifier material is between about 10 and 95 $m^2/g$.

49. The purifier material of claim 46, wherein the oxidation state of said metal in said purifier thin layer is lower than the maximum oxidation state of said metal.

50. The purifier material of claim 49, wherein said thin layer further contains said metal in a zero oxidation state.

51. The purifier material of claim 46, wherein said substrate is selected from the group consisting of alumina, amorphous silica-alumina, silica ($SiO_2$), aluminosilicate molecular sieves, titania ($TiO_2$) and zirconia ($ZrO_2$).

52. The purifier material of claim 46, wherein said purifier material is regenerable.

53. A purifier material for removing contaminants from a hydride gas stream, said purifier material comprising a nonreactive substrate having a surface and a thin layer of one or more reduced forms of an oxide of one or more metals deposited on said surface, wherein the total surface area of said thin layer is less than 100 $m_2/g$.

54. The purifier material of claim 53, wherein total surface area of said thin layer of said purifier material is between about 10 and 95 $m^2/g$.

55. The purifier material of claim 53, wherein the oxidation state of said metal of said purifier thin layer is lower than the maximum oxidation state of said metal.

56. The purifier material of claim 55, wherein said thin layer further comprises said metal in a zero oxidation state.

57. The purifier material of claim 53, wherein said one or more metals are selected from the group consisting of vanadium, molybdenum, antimony, bismuth, tin, cerium, chromium, cobalt, copper, tungsten, and mixtures thereof.

58. The purifier material of claim 53, wherein said substrate is selected from the group consisting of alumina, amorphous silica-alumina, silica ($SiO_2$), aluminosilicate molecular sieves, titania ($TiO_2$) and zirconia ($ZrO_2$).

59. A purifier material for removing contaminants from a hydride gas stream, said purifier material comprising a nonreactive substrate having a surface and a thin layer of one or more reduced forms of an oxide of one or more metals deposited on said surface, wherein the oxidation state of said metal of said purifier thin layer is lower than the maximum oxidation state of said one or more metals and the total surface area of said thin layer is less than 100 $m^2/g$.

60. The purifier material of claim 59, wherein said thin layer further comprises said metal in a zero oxidation state.

61. The purifier material of claim 59, wherein total surface area of said thin layer of said purifier material is between about 10 and 95 $m^2/g$.

62. A purifier material for removing contaminants from a hydride gas stream, said purifier material comprising a nonreactive substrate having a surface and a thin layer of reduced forms of an oxide of one or more metals deposited on said surface, wherein the total surface area of said thin layer is less than 100 $m^2/g$ and wherein the oxidation state of said one or more metals is lower than the maximum oxidation state of said metal, wherein said metal is selected from the group consisting of vanadium, molybdenum, antimony, bismuth, tin, cerium, chromium, cobalt, copper, tungsten, and mixtures thereof.

63. A method of preparing a purifier material for removing contaminants from a hydride gas stream, said method comprising:

(a) providing a precursor consisting essentially of a nonreactive substrate having a surface and a thin layer of a first form of one or more metals deposited on said substrate surface, wherein said first form is other than a metal oxide;

(b) heating said precursor under a flow of nitrogen at a temperature between about 100° C. and 600° C. for a period of time; and (c) treating said precursor from step (b) under conditions sufficient to convert said first form of said one or more metals to an oxide of said one or more metals, thereby producing a purifier material consisting essentially of a nonreactive substrate having a thin layer of an oxide of said one or more metals deposited said substrate surface, wherein the oxidation state of said metal oxide is the same as the oxidation state of said first form of said metal, and wherein the oxidation state of said metal of said purifier thin layer is lower than the maximum oxidation state of said metal.

* * * * *